United States Patent [19]

Newbold et al.

[11] 4,323,194
[45] Apr. 6, 1982

[54] SPINNER WATER DRIVE SYSTEM AND CONTROL

[75] Inventors: Don Newbold, Fremont; Owen W. Sherwin, Omaha, both of Nebr.

[73] Assignee: Valmont Industries, Inc., Valley, Nebr.

[21] Appl. No.: 104,956

[22] Filed: Dec. 18, 1979

[51] Int. Cl.$^3$ ............................................. A01G 25/09
[52] U.S. Cl. ................... 239/177; 137/624.14; 137/624.18
[58] Field of Search ............ 137/624.14, 624.18, 137/624.2; 239/177, 710, 718–721, 709, 1

[56] References Cited

U.S. PATENT DOCUMENTS

| | | | |
|---|---|---|---|
| Re. 28,727 | 3/1976 | Reinke | 239/177 |
| 3,233,832 | 2/1966 | Hallberg | 239/155 |
| 3,352,493 | 11/1967 | Curtis | 239/177 |
| 3,409,033 | 11/1968 | Johnston | 137/51 |
| 3,484,046 | 12/1969 | Harris | 239/177 |
| 3,556,405 | 1/1971 | Harris et al. | 239/177 |
| 3,558,257 | 1/1971 | Harris | 239/1 |
| 3,623,663 | 11/1971 | Koinzan | 239/177 |
| 3,680,778 | 8/1972 | Sisson et al. | 239/1 |
| 3,712,544 | 1/1973 | Ririe et al. | 239/177 |
| 3,713,296 | 1/1973 | Black | 60/452 |
| 3,720,232 | 3/1973 | Corliss et al. | 137/624.14 |
| 3,720,374 | 3/1973 | Ross | 239/177 |
| 3,780,947 | 12/1973 | Ririe et al. | 239/177 |
| 3,831,692 | 8/1974 | Fry | 180/14 R |
| 3,866,836 | 2/1975 | Dowd | 239/177 |
| 3,916,942 | 11/1975 | Townsend | 137/344 |
| 3,921,909 | 11/1975 | Hieb | 239/177 |
| 3,944,007 | 3/1976 | Thom et al. | 180/14 R |
| 3,957,204 | 5/1976 | Farris et al. | 239/177 |
| 3,983,898 | 10/1976 | Zimmerer et al. | 137/344 |
| 3,993,249 | 11/1976 | Hieb | 239/177 |
| 4,005,729 | 2/1977 | Townsend | 137/344 |
| 4,005,730 | 2/1977 | Townsend | 137/344 |
| 4,005,731 | 2/1977 | Townsend | 137/344 |
| 4,033,508 | 7/1977 | Jacobi et al. | 239/177 |
| 4,034,778 | 7/1977 | Sage et al. | 137/344 |
| 4,034,779 | 7/1977 | Townsend | 137/344 |
| 4,063,569 | 12/1977 | Olson et al. | 137/344 |
| 4,067,497 | 1/1978 | Cornelius | 239/177 |
| 4,073,309 | 2/1978 | Fraser et al. | 137/344 |
| 4,074,783 | 2/1978 | Arndt et al. | 180/14 R |
| 4,080,991 | 3/1978 | Groelz | 137/624.13 |
| 4,083,378 | 4/1978 | Stearns | 137/344 |
| 4,085,771 | 4/1978 | Hunter | 137/344 |
| 4,099,669 | 7/1978 | Cortopassi | 239/11 |
| 4,108,200 | 8/1978 | Cornelius | 137/344 |
| 4,120,454 | 10/1978 | Holtzen | 239/177 |
| 4,121,612 | 10/1978 | Conrad | 137/344 |
| 4,133,344 | 1/1979 | Hunter et al. | 137/344 |
| 4,135,539 | 1/1979 | Hunter et al. | 137/1 |
| 4,136,826 | 1/1979 | Ausherman | 239/212 |
| 4,139,018 | 2/1979 | Groelz | 137/344 |
| 4,155,679 | 5/1979 | Cornelius et al. | 415/29 |
| 4,195,781 | 4/1980 | Schole | 239/177 |

Primary Examiner—Andres Kashnikow
Attorney, Agent, or Firm—Rogers, Eilers & Howell

[57] ABSTRACT

An average speed spinner water drive system for a center pivot irrigation system has a first group of sprinklers spaced along the main conduit which are continuously on, and a second group of pairs of sprinklers, each pair having an associated spinner drive which is sequenced on to drive the system. By sequencing sprinklers in combination with spinner drives, applicant's average speed system delivers an amount of water which is directly proportional to the speed of the system through the field. Each support tower is provided with a totally mechanical and hydraulic alignment control for sensing when it is behind the next outermost section of conduit and sequencing on its spinner drive to bring it into alignment. A percentage timer is used to set the speed of the system and thus the amount of water applied to the field. The percentage timer has a hydraulic motor turning a shaft with two individually adjustable cams to operate hydraulic start and stop valves. An overwatering timer mounted on the next to outermost support tower measures the time delay between "on" intervals of the master spinner drive and stops the system if the delay exceeds a predetermined period. The overwatering timer includes a cylinder with a free floating piston and water is applied to opposite ends of the cylinder with a mechanically operated valve at one end to shut off the system when the piston is driven to that end.

19 Claims, 7 Drawing Figures

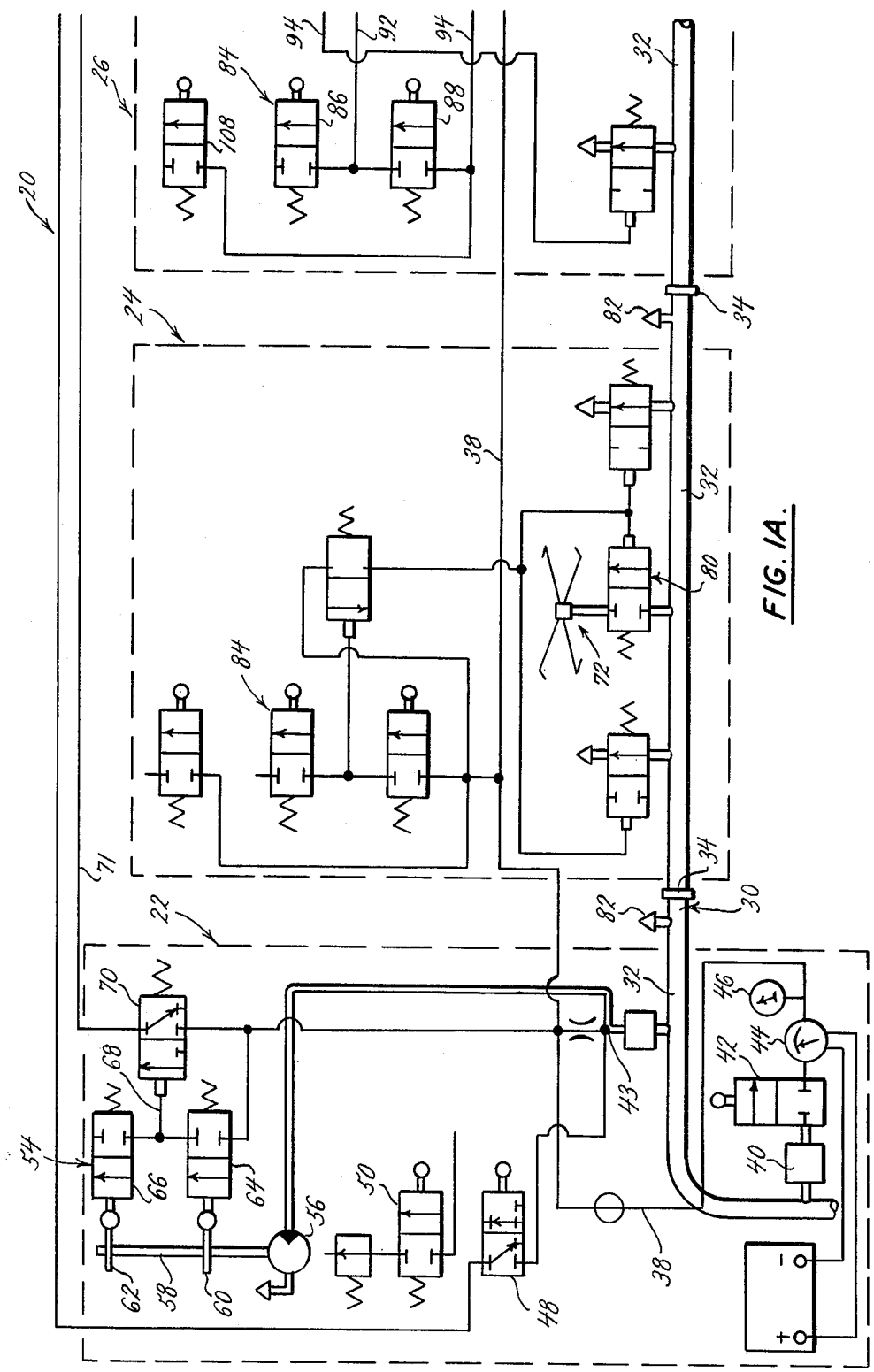
FIG. IA.

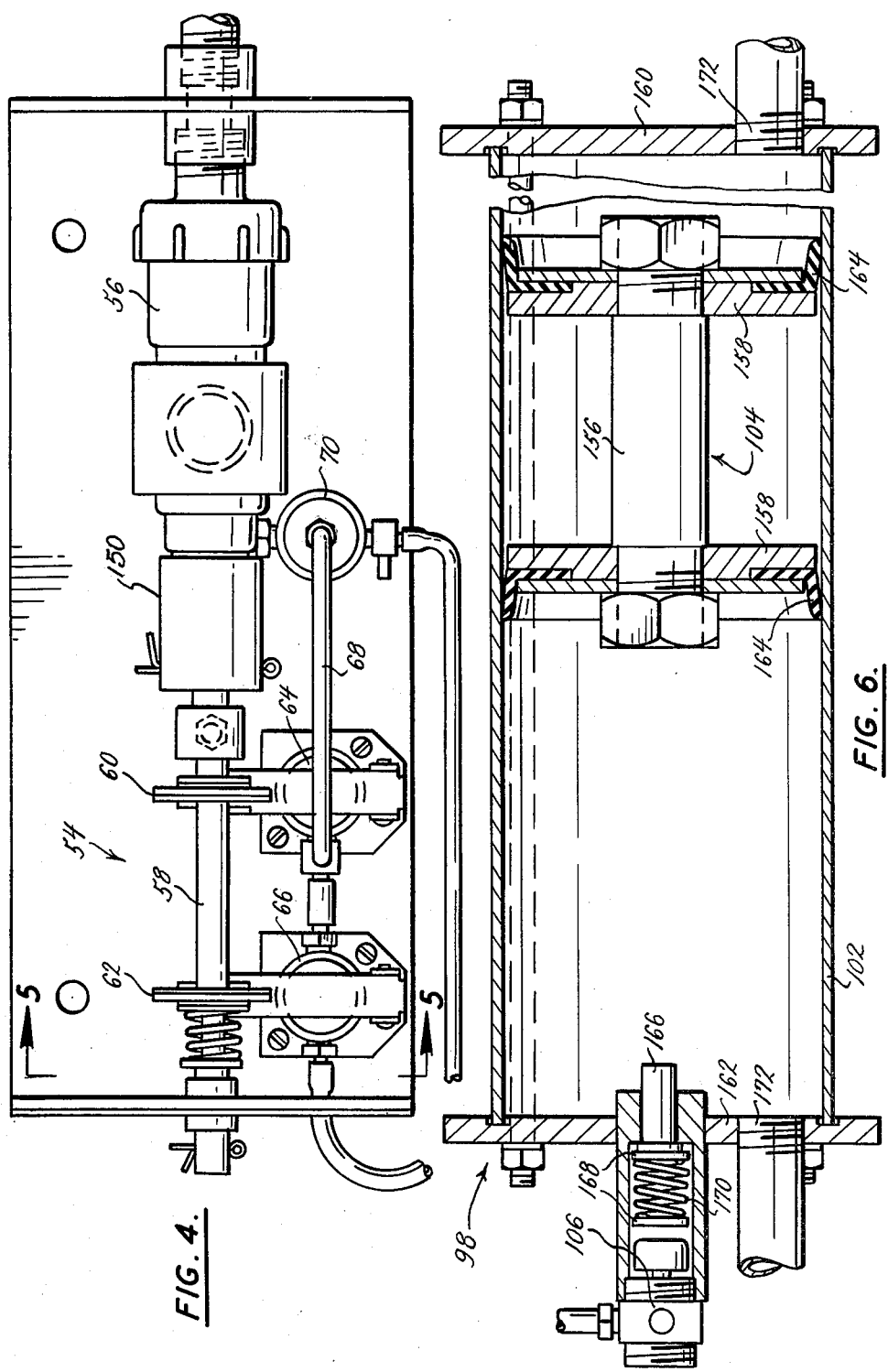

SPINNER WATER DRIVE SYSTEM AND CONTROL

BACKGROUND AND SUMMARY

There have been many control and power designs for center pivot irrigation systems and some provide features and advantages which are very important depending upon the particular location and application. Some examples of typical center pivot systems include U.S. Pat. Nos. 3,672,572; 3,797,517; 3,802,627; 3,902,668; and 3,979,062, the disclosures of which are hereby incorporated by reference. Some considerations in designing the controls and drive include the amount of available water and its pressure, the availability of electric power, the complexity of the system both from an initial cost and ease of maintenance standpoint, and safety is always an important consideration.

The spinner drive system is one type of drive system which has been developed but the prior art designs generally have drawbacks which limit their effectiveness. A spinner drive system is generally characterized by a rotating arm driven by the pressure of the water in the main conduit which rotates a drive shaft to turn the wheels of a support tower and thereby drive the conduit through the field. This basic design benefits from its simplicity, but there are several requirements of a center pivot system which must be met by some additional complexity. One such requirement is that some method must be devised to control the relative speeds of the drives for the support towers. Support towers near the pivot or center of the revolving conduit move much slower than support towers near the outer end. In the prior art, this problem was solved by throttling the supply of water to the spinner. A reduced water pressure and flow through the spinner arm results in a slower revolution of the arm and a slower drive speed. However, by reducing the pressure and flow of water to a spinner, the driving torque is correspondingly reduced which significantly reduces the ability of an inner, slower moving support tower to traverse ridges and valleys in the field. This is a significant drawback and greatly limits the terrain that the spinner drive system can be used on.

Other prior art designs have solved the torque and speed problems by providing a control system to cycle the spinner drive off and on so as to achieve an average speed, much as in the electric drive systems. Although the average speed system solves the torque problem, many of the prior art designs use complicated mechanical linkages and/or electrical controls with electrical lines extending along the length of the conduit and in close proximity to the large quantities of water delivered through such an irrigation system. As can be appreciated, an electrical control system increases the initial cost of the system, extends the maintenance and troubleshooting problems from simple hydraulics to include electrical circuits, and requires a source of electricity (or increased capacity if an electrical pump is required) for achieving proper irrigation.

An average speed drive solves the torque problem but creates another as it is impossible, without more, to vary the amount of water applied to the field with an average speed spinner drive system. This is because once a drive gear ratio is chosen, each support tower sweeps through a given area of field for a given number of revolutions of the spinner. A given number of revolutions of the spinner applies a given amount of water to the field, assuming no change in water pressure. Therefore, a given amount of water is applied to the field because changing the speed of the system by changing the ratio of on/off time does not change the total number of revolutions required for each support tower to traverse the entire field. As can be appreciated, this greatly limits the versatility of what may be a rather expensive irrigation system as each system would be limited to delivering only one amount of water without complicated and time consuming mechanical changeover of the gearboxes or spinner nozzles.

Applicant has solved these problems of the prior art by developing an average speed spinner drive system which utilizes totally hydraulic and mechanical controls while providing a variable water application rate. Applicant's system may also be easily converted for reverse rotation in the field which is highly desirable in those applications that make it impossible for the irrigation system to rotate continuously through the field because of buildings or other obstructions. As there are no electrical controls in applicant's system, there are no expensive and potentially hazardous runs of electrical lines along the length of the conduit which minimizes the maintenance costs and complexity. This also enhances the versatility of the system by enabling it to be used in remote locations where there is no available electrical power except that produced by a small generator used to pump the water. Applicant's system is an elegantly unique combination of valve controls for each support tower which use a mechanical linkage to detect a misalignment with an adjacent section of conduit, and sequence on the spinner drive at its associated support tower to move the section of conduit back into alignment. The outermost tower is the master tower which leads the system through the field. It is controlled by a selectively adjustable percentage timer which has adjustable cams for sequencing on and off its spinner drive. An overwatering timer on one of the inner tower assemblies detects when a spinner drive has not been sequenced on for a preselected period of time such that some malfunction in the speed control is highly likely. The overwatering timer then shuts down the entire system.

As mentioned, applicant's system combines the advantages of an average speed spinner drive system with a wide range of adjustability in the amount of water applied to the field, with the amount applied being directly proportional to the speed of the system through the field. Applicant accomplishes this with a first group of sprinklers along the main conduit which are continuously on and a second group of pairs of sprinklers which are sequenced on only when an associated spinner drive is sequenced off. Each of the pairs delivers substantially the same amount of water as its associated drive and to substantially the same area of field. Also, the first group of sprinklers delivers substantially the same amount of water per unit of field area as do either the spinner drive or its associated sprinkler pair. Thus, there is no difference between the amount of water received by the section of field being irrigated with the spinner-sprinkler combination as that being irrigated by the continuously on sprinklers. In this manner, the amount of water applied is directly proportional to the speed of the system and a substantially even coverage of the field is achieved.

Applicant's spinner drive system and control has other features and benefits which are more fully explained, along with the preceding features, in the description of the preferred embodiment and drawings which follow.

BRIEF DESCRIPTION OF THE DRAWINGS

FIGS. 1A and 1B are a schematic of the hydraulic control and watering circuits for the system;

FIG. 4 is a top view of the hydraulic percentage timer;

FIG. 6 is a cross-sectional view of the overwatering timer.

DETAILED DESCRIPTION OF THE PREFERRED EMBODIMENT

Figure 1B:
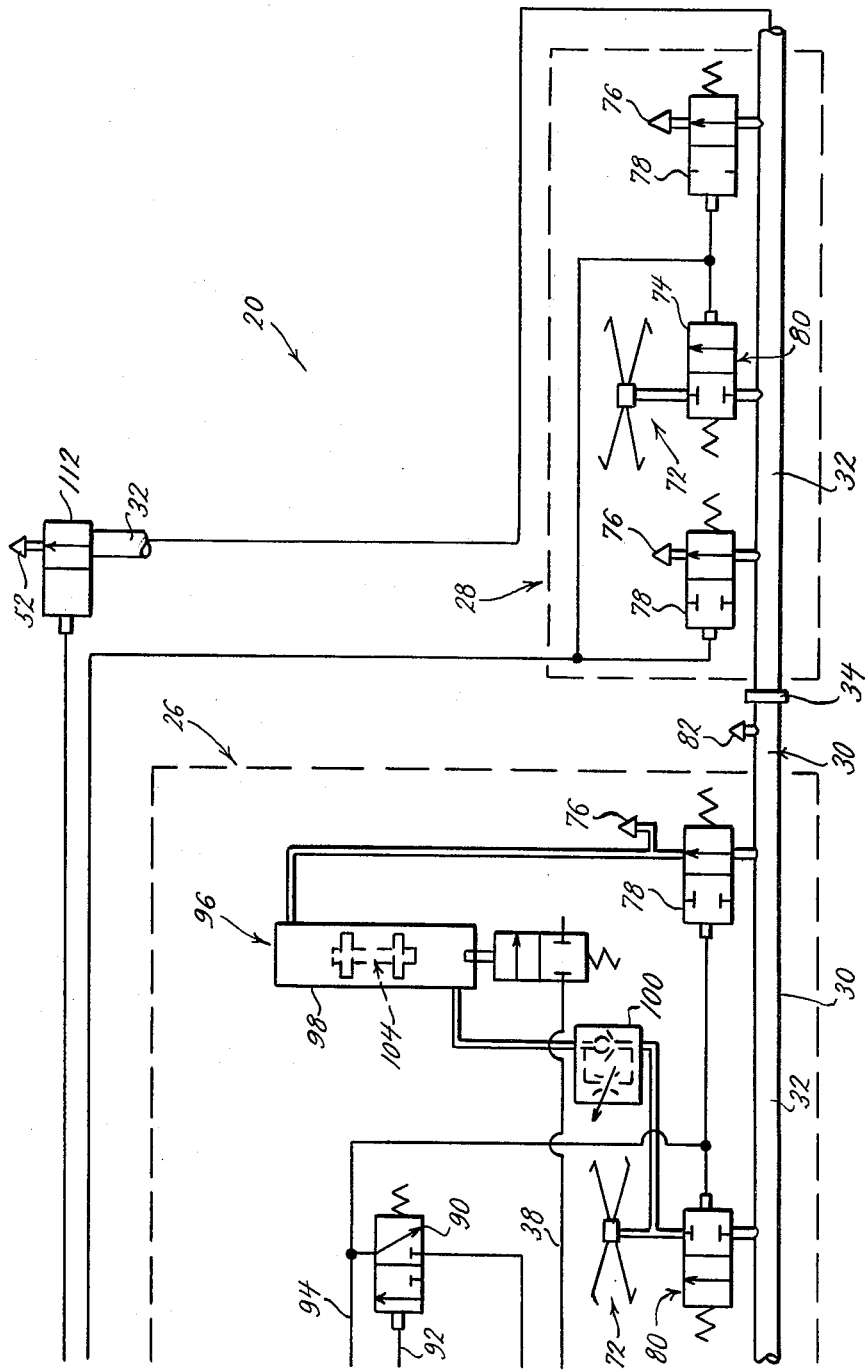

Applicant's spinner water drive system 20 is shown schematically in FIG. 1 and its controls may be generally grouped for description purposes as a pivot assembly 22, an inner tower assembly 24, a next-to-last tower assembly 26, and a last tower assembly 28. This system is set up for installation on a typical center pivot irrigation system which includes many general features which are commonly known in the art and which will not be described in detail. More specifically, applicant's pivot assembly 22 is mounted at the pivot where a source of water (not shown) is pressurized and pumped into a main conduit 30 which is comprised of a plurality of rigid sections 32 joined together by a plurality of flexible connectors 34. A support tower 36 (shown in FIG. 2) supports and drives each section 32 of conduit by detecting a misalignment of adjacent sections 32 and sequencing on a drive to bring that support tower's 36 associated section 32 into alignment.

The pivot assembly 22 of applicant's spinner water drive system 20 includes a circuit for pressurizing a control line 38 from the main conduit 30 and which is used to sequence the controls included in applicant's system. Control line 38 is pressurized by tapping into main conduit 30, as shown, and providing a filter 40, an override valve 42, a low pressure shutoff 44, and a pressure gauge 46. After override valve 42 has been closed, control line 38 is supplied with water pressure through a small fixed orifice 43. The override valve 42 provides a means to fast fill the pilot circuit manually at the pivot and the low pressure shutoff 44 monitors the water pressure and control line 38 and electrically shuts down the pump (not shown) should the control line 38 pressure drop below the required operating range to assure reliable operation of the system. An end gun shutoff valve 48 and a stop-in-slot shutoff valve 50 are controlled by mechanical limit switches at the pivot, as is known in the art. These controls permit the automatic shut off of the end gun 52 for those sections of the field not requiring its operation, and the stop-in-slot valve 50 is used to prevent irrigation of a road or the like extending from the outer edge of the field to the pivot, as is known in the art. A percentage timer 54 is shown more specifically in FIG. 4 but will be described here in connection with FIG. 1 for purposes of understanding the overall operation of the system. The percentage timer 54 includes a water motor 56 which is used to drive a shaft 58 having cams 60 and 62 which in turn operate a start valve 64 and a stop valve 66, respectively. The relative position of cams 60, 62 are adjustable and water motor 56 is a steady speed continuously operating motor which rotates shaft 58 so that start valve 64 and stop valve 66 may be selectively sequenced on and off for any given portion of the period of rotation of shaft 58. For example, if cams 60 and 62 are positioned 180° apart, start valve 64 is on for one-half or 50% of the period of rotation of shaft 58. When start valve 64 is on, the pressure from control line 38 is provided through line 68 to operate pilot valve 70. When stop valve 66 operates, the pressure from line 68 is dumped which turns off pilot valve 70 and resets start valve 64. When pilot valve 70 is on, pressure is supplied to line 71 which is piped to the last tower assembly 28 as shown on the drawing. It should be noted that pilot valve 70 and other pilot valves disclosed, infra, need not be provided and that other valve arrangements could be used which could accomplish the same sequencing functions, as is known in the art.

Last tower assembly 28 includes a spinner drive 72 which is controlled by a normally closed sequencing valve 74 parallel connected with two sequencing sprinklers 76, each of which is respectively controlled by a normally open sequencing valve 78. The last tower assembly 28 is the master for the system and is directly controlled by the percentage timer 54 to determine the speed of the system through the field. For example, if the percentage timer 54 is set for 100% operation, then the spinner drive 72 is continuously on and the maximum speed of the system is attained. With the percentage timer 54 set for a 50% duty cycle, the system takes twice as long to traverse the field. Other percentage timer 54 settings can be similarly calculated.

The sequencing control 80, consisting of valves 74, 78, for the last tower assembly 28 ensures that either the spinner drive 72 or the sequencing sprinklers 76 are always on. A plurality of continuously on sprinklers 82 extend along main conduit 30 and waters those sections of field which are not irrigated by the combination spinner drive 72 and sequencing sprinklers 76. As the application rate and pattern of water delivery of sequencing sprinklers 76 is chosen to match that of spinner drive 72, the field receives a substantially equal application of water whether it is being irrigated by continuously on sprinklers 82 or the combination of spinner drive 72 and sequencing sprinklers 76. Thus, as the percentage timer 54 provides a continuously repeating pattern of movement which the inner tower assemblies follow from the last tower assembly master, the field receives an equal application of water throughout the entire sweep of the system.

Figure 3:
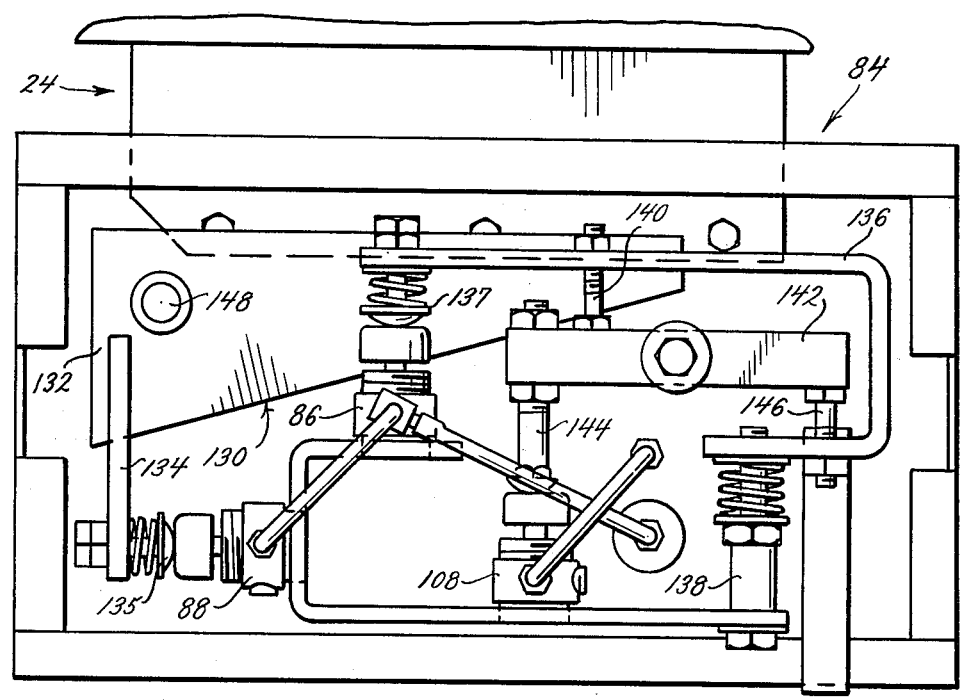
FIG. 3 is a top view of the sequencing control at a typical support tower.
Figure 5:
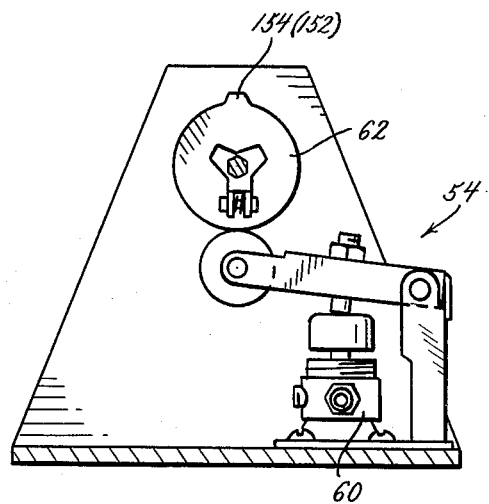
FIG. 5 is a side view of the hydraulic percentage timer.

The next-to-last tower assembly 26 includes the same type of sequencing control 80 as is provided on last tower assembly 28 except that the operation of sequencing control 80 is controlled by an alignment control 84 shown in FIG. 3. Sequencing control 80 includes a start valve 86, a stop valve 88, and a pilot valve 90. Alignment control 84 detects a misalignment between a section 32 of conduit and the last section 32 of conduit which occurs as the last support tower 36 moves through the field in response to percentage timer 54. When this misalignment reaches a preselected angle, alignment control 84 operates start valve 86 which pressurizes line 92, turning on pilot valve 90 which pressurizes line 94 to provide the control signals for sequencing control 80. When the spinner drive 72 advances the section 32 of conduit back into alignment with the outer section 32 of conduit, alignment control 84 operates stop valve 88 which dumps the pressure in line 92, turning off pilot valve 90, resetting start valve 86 and shutting down spinner drive 72 through sequencing control 80. Thus, the next-to-last tower assembly 26 follows the last tower assembly 28 through the field.

Also included in the next-to-last tower assembly 26 is an overwatering circuit 96 which includes an overwatering timer 98 shown more specifically in FIG. 6. Overwatering circuit 96 includes a oneway flow control valve 100 connected in series with spinner drive 72 such that water flows through flow control valve 10 into one end of cylinder 102 of overwatering timer 98 when spinner drive 72 is on. Similarly, the opposite end of cylinder 102 is provided with water when sequencing sprinkler 76 is on by being connected in series therewith. A floating piston 104 moves back and forth in cylinder 102 in response to the pressure supplied at either end thereof. Flow control valve 100 allows the full pressure of water from sprinkler 72 to flow towards cylinder 102 but only allows a preselected portion of water to flow back out of cylinder 102 when sequencing sprinkler 76 is on. Thus, floating piston 104 is rapidly reset when spinner drive 72 is sequenced on but is slowly advanced through cylinder 102 when sequencing sprinkler 76 is on, the rate of advance being determined by the setting of flow control valve 100. When floating piston 104 reaches the extreme end of cylinder 102, a two way valve 106 is mechanically operated to dump the pressure in main control line 38 and shut down the entire system including the pump through the low pressure shutoff 44. This happens when an extended period of time elapses between "on" sequences of drive 72 on the next-to-last tower assembly 26. This means that the last tower assembly 28 has failed to regularly advance and a malfunction has occurred, as the next-to-last tower assembly 26 is a slave to the movement of the last tower assembly 28. This prevents the system failure commonly referred to as "overwatering" by the system remaining stationary and continuously applying water to that portion of field under the system at the moment of failure.

A safety valve 108 is also operated by the alignment control 84, but only when the misalignment is significantly greater than that experienced during the normal operation of the system. This results when, for some reason, the corresponding spinner drive 72 at that particular tower has not advanced in response to a section 32 misalignment. This could be due to a failure of sequencing control 80.

As can be seen from FIG. 1, the inner tower assembly 24 includes a spinner drive 72, sequencing control 80 and alignment control 84 which functions exactly as explained in connection with the next-to-last tower assembly 26. An inner tower assembly 24 is provided for every support tower 36 except the outer two. Also shown in FIG. 1 is an end gun 52 and a hydraulic control valve 112 which is operated by the end gun shutoff valve 48, as previously explained.

Figure 2:
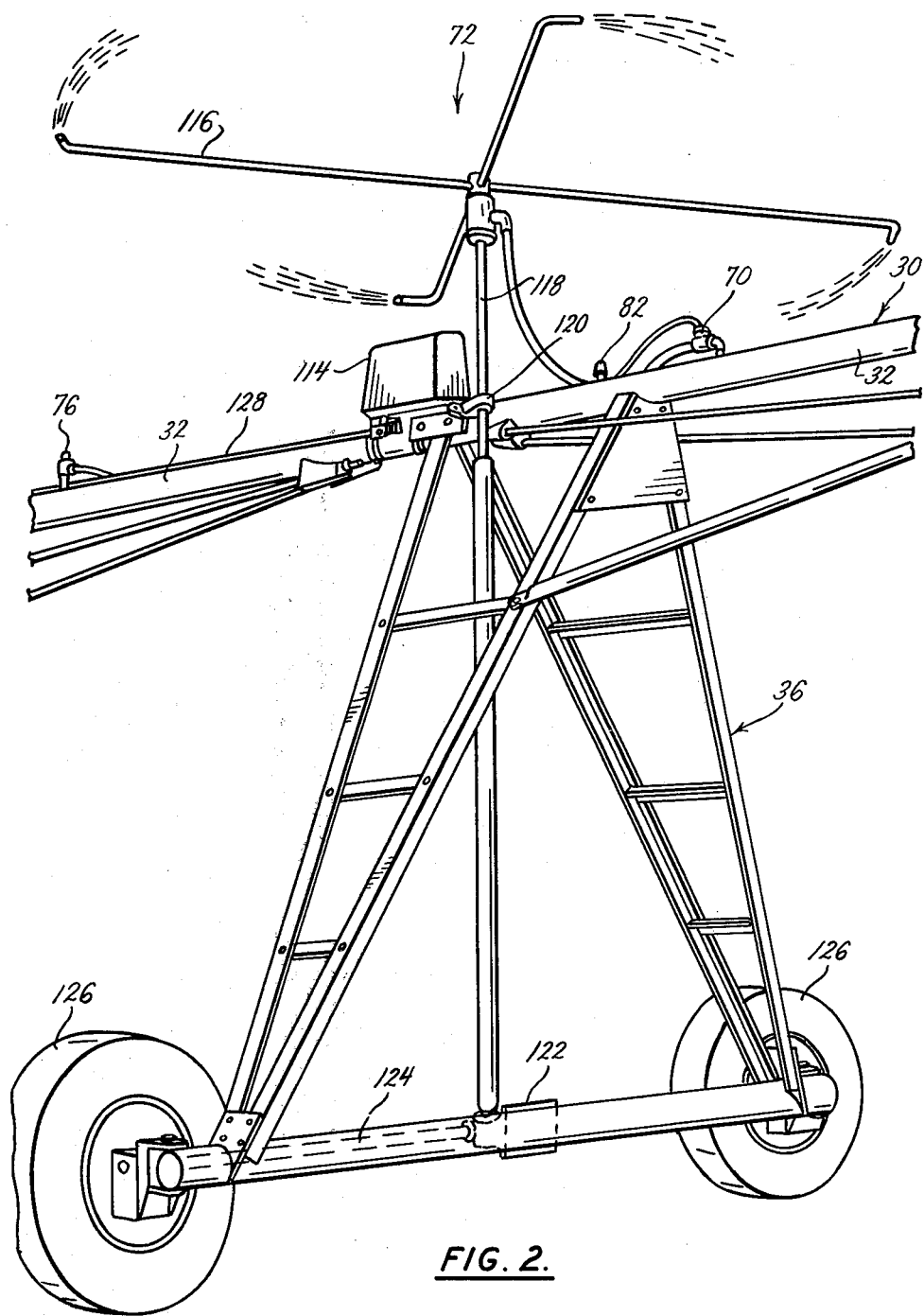
FIG. 2 is a perspective view of a support tower with a spinner drive and its associated controls.

Referring to FIG. 2, a support tower 36 is shown in perspective along with sections 32 of main conduit 30. An inner tower assembly 24 is shown as being housed in a control box 114. The spinner drive includes a spinner arm 116, a drive shaft 118 which is supported by bearing 120 or the like, extending down into a gearbox 122. Two wheel drive shafts 124 extend from the gearbox 122 to the wheels 126 of support tower 36 and are driven thereby. A mechanical control arm 128 is the mechanical operator for the alignment control 84 which is contained in control box 114 and operates as previously described. Sequencing sprinklers 76 are shown spaced apart from the support tower 36 and pilot valve 70 is shown mounted at the top conduit 30. As can be appreciated, when the water is diverted to spinner drive 72, spinner arm 116 rotates which in turn rotates drive shaft 118, gearbox 122, and wheel drive shafts 124 so as to propel support tower 36 through the field.

As shown in FIG. 3, an inner tower assembly 24 is shown including both a sequencing control 80 and an alignment control 84. The alignment control 84 has a mechanical operator 130 to operate the sequencing control 80 including start valve 86, stop valve 88, and safety valve 108. Mechanical operator 130 includes a triangular base plate 132 with operating arms 134 and 136. Arm 134 has a carriage bolt operator 135 for operating stop valve 88, arm 136 has a second carriage bolt operator 137 for operating start valve 86 and a spring loaded stud 138 takes up any slack in mechanical operator 130. A push rod 140 is mounted to operating arm 136 and in turn is adjusted to abut a rotatably mounted swivel arm 142. Swivel arm 142 has a carriage bolt operator 144 extending outwardly therefrom and contacting the mechanical operator of safety valve 108. A mechanical stop bolt 146 limits the reverse rotation of swivel arm 142, as is shown in the drawing. The mechanical operator 130 is secured to operating shaft 148 which in turn is secured to control arm 128 (shown in FIG. 2). Thus, as control arm 128 responds to a change in alignment between adjacent sections of conduit 32, operating shaft 148 is caused to rotate and thereby operate either stop valve 88 or start valve 86. Push rod 140 simultaneously causes swivel arm 142 to urge carriage bolt operator 144 against the mechanical operator for safety valve 108. However, the respective operators are adjusted such that start valve 86 is operated before safety valve 108 which should cause spinner drive 72 to turn on and advance conduit section 32 into an aligned condition. However, if spinner drive 72 fails to advance conduit section 32, then control arm 128 continues to rotate operating shaft 148 and will eventually operate safety valve 108 to shut down the entire system.

Referring to FIG. 4, percentage timer 54 is shown in greater detail and includes start valve 64, stop valve 66, pilot valve 70, line 68, water motor 56, shaft 58, and cams 60 and 62. Water motor 56 continuously rotates shaft 58 through coupling 150 which in turn causes cams 60, 62 to rotate. Cams 60, 62 have operating lobes 152, 154 respectively which depress the mechanical operators of start and stop valves 64, 66. Thus, by changing the relative position of cams 60, 62 and operating lobes 152, 154; pilot valve 70 may be sequenced on a preselected percentage of the period of rotation of shaft 58.

Referring to FIG. 6, overwatering timer 98 is shown in greater detail and includes cylinder 102, floating piston 104, and two way valve 106. Floating piston 104 includes a piston rod 156 extending between two piston heads 158 which separate the sprinkler end 160 from the spinner end 162 of cylinder 102. Seals 164 are provided around piston heads 158 to prevent leakage of water between sprinkler end 160 and spinner end 162. Two way valve 106 includes a plunger 166, spring plates 168, and return spring 170. Thus, as piston rod 156 contacts plunger 166, return spring 170 is compressed between spring plates 168 until sufficient force is developed to operate two way valve 106. Inlet ports 172 are provided for connection to the supply lines at each of the sprinkler and spinner ends 160, 162.

OPERATION

The system may be operated by selecting a speed and adjusting the percentage timer 54 to correspond to the preselected speed and water application. The supply of water is connected or pressurized by turning on a pump or the like and the override valve 42 is turned on to fast fill the control line 38. Once the control line 38 is filled, override valve 42 is shut off. Control line 38 is then supplied with water through small fixed orifice 43. As the percentage timer 54 cycles on, pilot valve 70 pressurizes line 71 which turns on spinner drive 72 at the last tower assembly 28, thus causing its corresponding section 32 of conduit 30 to begin movement. When a sufficient angle has been created between the two outer sections 32, alignment control 84 actuates sequencing control 80 to turn on spinner drive 72 at the next-to-last tower assembly 26. Thus, the next-to-last section 32 of conduit 30 follows the outside section of conduit in its sweep through the field. Similarly, the inner tower assemblies 24 respond to the misalignment between sections 32 of conduit and an alignment control 84 on each of those inner tower assemblies cause them to follow the next most outer support tower 36.

While the system is rotating, sprinklers 82 are continuously on to deliver a preselected and balanced amount of water. The spinner drive 72 supplies a substantially equal amount of water as sprinklers 82 to that portion of the field swept by spinner 72. When spinner drive 72 is sequenced off, two sequencing sprinklers 76 are automatically turned on and these sprinklers deliver an equal amount of water to the portion of field swept by spinner drive 72. Thus, the field is continuously receiving water from sprinklers 82, and either sequencing sprinklers 76 or spinner drive 72. Each spinner drive 72 and its associated sequencing sprinklers 76 are selected to deliver an equal amount of water. However, it has been found that the spinner drive 72 is not as efficient in distributing water throughout its portion of the field so its flow rate is greater than the combined flow rate of the two sequencing sprinklers 76. For example, in one such system it has been calculated that a sprinkler flow rate of approximately 15% less than the spinner is desirable in achieving uniform irrigation.

A safety valve is provided at each of the towers except the last and these valves along with alignment control 84 detect when misalignment between adjacent sections 32 of conduit exceeds normal. When this occurs, a safety valve 108 will shut down the entire system by dumping the pressure from the master control line 38, actuating the low pressure shutoff 44 and shutting down the pump. Thus, misalignment of two adjacent sections 32 beyond the normal operating range will shut the entire system off and prevent damage to the system.

An overwatering timer 98 on the next-to-last tower assembly 26 detects when the last tower assembly 28 has not moved within a predetermined length of time. This usually indicates a failure of the percentage timer 54 or the spinner drive 72 of the last tower assembly 28. If this occurs, a two way valve 106 is actuated to dump the pressure from main control line 38 and shut the entire system down.

In normal operation, the system continues to rotate until a complete revolution has been made or until one of the limit switches at the pivot actuates a shutoff valve (such as the stop-in-slot shutoff valve 50). The system turns all the water pressure and pump off and stands ready for reverse rotation, with a few simple reconnections.

The system may be easily converted to reverse its direction of rotation by reconnecting the control line connection from start valve 86 to stop valve 88 in the alignment control 84 of each tower and reversing the spinner arm 116. All the mechanical linkages and other connections remain the same for either direction of rotation, thus adding to the versatility of the system.

Applicant has disclosed and described his preferred embodiment for purposes of illustration of his invention only. Various changes and modifications would be obvious to one of ordinary skill in the art in view of applicant's teaching. Applicant intends that his invention include these obvious improvements and changes and that his invention be limited only by the scope of the claims appended hereto.

What is claimed is:

1. A center pivot irrigation system comprising a main conduit, a plurality of sprinklers spaced along the conduit for applying water to a field, a plurality of support towers spaced along said conduit, a spinner drive at each support tower for powering its associated support tower and the conduit, each spinner drive having at least one associated sprinkler, means to control each spinner drive and its associated sprinkler so that said associated sprinkler is sequenced on whenever the spinner drive is off, each spinner drive and its associated sprinkler having a sufficient water delivery so that the portion of field irrigated by each spinner drive and sprinkler combination receives substantially the same application of water as other portions of the field being irrigated.

2. The device of claim 1 further comprising means to vary the amount of water applied to the field by varying the speed of the conduit through the field.

3. The device of claim 1 wherein the conduit is composed of a plurality of sections, each section having an associated support tower, and further comprising means to select a repeated sequence of operation for the outermost spinner drive and its associated sprinkler.

4. The device of claim 3 wherein at least one support tower has means to detect misalignment between sections of conduit and sequence on its associated spinner drive in response thereto to adjust said misalignment.

5. The device of claim 4 wherein each support tower except said outermost one has said detection means, said outermost support tower acting as a master and all other support towers acting as slaves.

6. The device of claim 1 wherein all spinner drives and controls are hydraulically operated.

7. The device of claim 1 wherein the system may be powered in either the clockwise or counterclockwise direction and means to convert the system from one direction to the other.

8. The device of claim 4 further comprising means to sense when sections of said conduit are misaligned beyond normal and means to stop the system when said misalignment is sensed.

9. The device of claim 4 further comprising means to sense when a section of said conduit has been stationary beyond a predetermined period of time and means to shut the system off in response thereto.

10. The device of claim 8 wherein the misalignment detection means includes a start valve, and a stop valve, mechanical means to open said start valve when a misalignment occurs, said start valve thereby simultaneously sequencing on the spinner drive and sequencing off the associated sprinkler, and mechanical means to open said stop valve when said misalignment has been corrected to thereby simultaneously sequencing off the spinner drive and sequencing on the associated sprinkler, all of said valves being hydraulically or mechanically operated.

11. The device of claim 10 further comprising a pilot valve which is operated by said start and stop valves.

12. The device of claim 11 wherein the abnormal misalignment sensing means includes a mechanically operated safety valve, and further comprising a master hydraulic control line interconnecting all of said misalignment detecting means, said safety valve opening when operated to dump the pressure in said master hydraulic control line, a pump which supplies fluid pressure to said irrigation system and control line, and means to detect the drop in pressure in said control line and shut down said pump.

13. The device of claim 9 wherein said stationary detection means is mounted on the support tower adjacent the outermost support tower and includes a cylinder, a piston disposed within said cylinder, a one-way flow control valve hydraulically connected between the spinner and one end of said cylinder, the other end of said cylinder being hydraulically connected to the opposite end of said cylinder, and a two way valve connected to the spinner end of said cylinder so that said piston operates said two way valve when it is advanced to the spinner end of said cylinder.

14. A center pivot irrigation system having a power means including a main conduit comprised of a plurality of sections, a plurality of support towers, each support tower having an average speed type spinner drive, a plurality of sprinklers extending the length of the conduit, each spinner having at least one associated sprinkler with means sequencing on said associated sprinkler whenever said spinner drive is off, means to sequence on said spinner drive whenever its associated support tower is behind the next most outer support tower, means to select and control the sequencing of the spinner drive on the outermost tower and thereby select and control the speed of the system, said system applying a substantially equal application of water throughout the field, the amount of water applied to the field being proportional to the speed of the system.

15. A center pivot irrigation system including a main conduit having a plurality of average speed spinner drives and associated sprinklers with means to balance the water applied to the field by said spinner drives and associated sprinklers so that a substantially equal amount of water is applied to all parts of the field and the amount of water applied by said spinner drives and associated sprinklers is proportional to the speed of the system and means to change the speed of the system and thereby change the amount of water applied to the field.

16. The device of claim 14 or 15 wherein the water balancing means includes at least one sprinkler associated with each spinner drive and means to sequence on said associated sprinkler whenever the spinner drive is off, said associated sprinkler being mounted in said main conduit and having a spray pattern and flow rate which substantially duplicates the spray pattern and flow rate of the spinner.

17. A hydraulic control for providing a repeated sequencing of a supply of fluid including a start valve, and a stop valve, an operating line connected between said valves so that as said start valve is operated the fluid supply pressurizes said operating line and as said stop valve is operated the operating line is de-pressurized thereby turning off and resetting said start valve, and means to operate said start and stop valves repeatedly in a preselected sequence.

18. The device of claim 17 further comprising a pilot valve operated by said start and stop valves, said operating line being connected to the pilot valve.

19. The device of claim 17, wherein the operation means includes a hydraulic motor, a shaft rotated by said motor, a pair of cams mounted on said shaft, one cam aligned to operate the start valve, and the second cam aligned to operate the stop valve, said cams being adjustable to vary the operating sequence of said start and stop valves.

* * * * *